United States Patent [19]

Parodos

[11] Patent Number: 5,457,356

[45] Date of Patent: Oct. 10, 1995

[54] FLAT PANEL DISPLAYS AND PROCESS

[75] Inventor: Themis Parodos, Maynard, Mass.

[73] Assignee: Spire Corporation, Bedford, Mass.

[21] Appl. No.: 104,781

[22] Filed: Aug. 11, 1993

[51] Int. Cl.⁶ .................................................. H01J 17/49
[52] U.S. Cl. ......................... 313/505; 313/583; 313/584; 345/80
[58] Field of Search ..................... 313/505, 485, 313/581–585, 422; 345/60, 76, 80

[56] References Cited

U.S. PATENT DOCUMENTS

| | | | |
|---|---|---|---|
| 4,190,855 | 2/1980 | Inoue | 357/80 |
| 4,218,632 | 8/1980 | Ernsthausen et al. | 313/485 |
| 4,361,384 | 11/1982 | Basserman | 350/174 |
| 4,689,522 | 8/1987 | Robertson | 313/506 |
| 4,717,606 | 1/1988 | Hale | 428/1 |
| 4,717,859 | 1/1988 | Sohn | 313/505 |
| 4,733,128 | 3/1988 | Tohda et al. | 313/503 |
| 4,862,033 | 8/1989 | Migita et al. | 318/502 |
| 4,987,339 | 1/1991 | Robertson | 313/502 |
| 5,060,027 | 10/1991 | Hart et al. | 357/17 |
| 5,070,026 | 12/1991 | Greenwald et al. | 437/3 |
| 5,084,961 | 2/1992 | Yoshikawa | 29/840 |

OTHER PUBLICATIONS

A. H. Kitai and G. J. Wolga, Two–color Thin–film electroluminescence with spatially selective activator doping *Proceedings of the SID*, vol. 25/1, 1984.
A. H. Kitai, Effect of Mn Concentration on electron excitation in ZnS:Mn Electroluminescent devices. Elsevier–Science Publishers Journal of Luminescence 39 1988.
Tuomo Suntola, Microchemistry Ltd., Thin film EL–displays. IEEE, 1989. pp. 2–32.
Michael Schneider "Flip–Chip Bonding Offers Packaging Alternative". *Hybrid Circuit Technology*, Mar. 1988. pp. 29–31.
Gail M. Robinson "Ideas Abound for Flat–Panel Displays" *Design News*, Aug. 5, 1991 pp. 60–64.
Barry K. Gilbert et al. "Packaging of GaAs Signal Processors on Multi–chip Modules" *IEEE Transactions on Components, Hybrids & Manufact. Techol.*, vol. 15 No. 1, Feb. 1992.
Gary Bailey "Recent developments on a 128×128 indium antimonide/FET ..." *SPIE* vol. 686, 1986. pp. 76–83.

*Primary Examiner*—Sandra L. O'Shea
*Assistant Examiner*—Vip Patel
*Attorney, Agent, or Firm*—Morse, Altman, Dacey & Benson

[57] ABSTRACT

A flat panel display, such as a head mounted display, and a process for its manufacture are disclosed. Essentially, the flat panel display comprises separately manufactured flat panels including a display material and driver chips that are bump-bonded to the flat panels preferably by using flip chip technology. The flat panel display is particularly applicable to miniature display applications and is characterized by being rugged yet reliable, in color but with good luminescence across the spectrum of the primary colors of red, blue and green. Pixels preferably are addressed by passive matrix activation. Preferably, the display material of the flat panels is a thin film electroluminescent material, a passive matrix liquid crystal material, a plasma display material or a field emission display material.

17 Claims, 3 Drawing Sheets

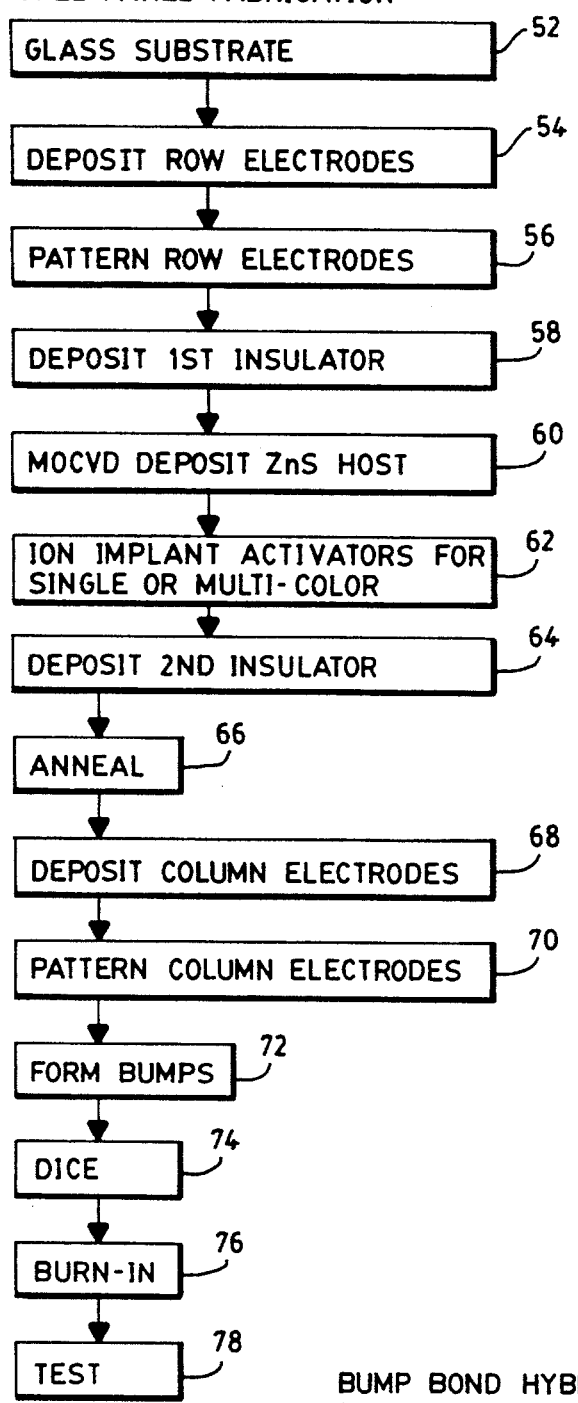
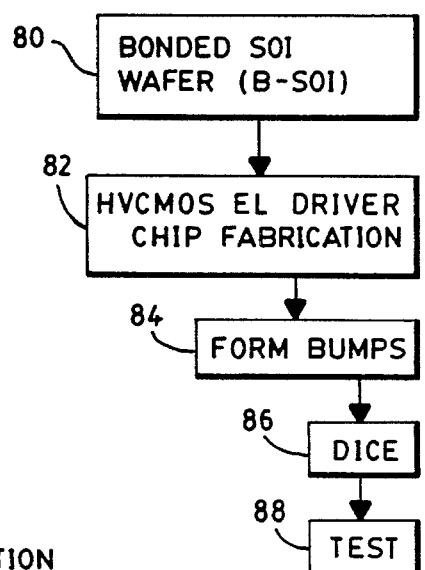
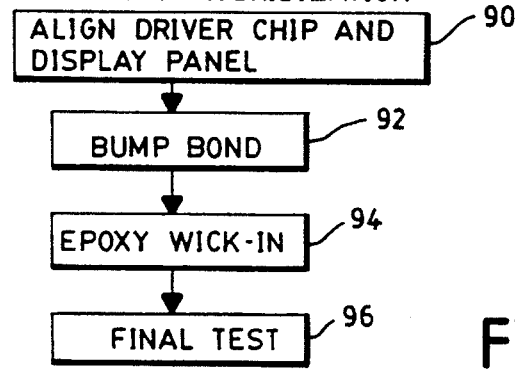
FIG. 3

FLAT PANEL DISPLAYS AND PROCESS

BACKGROUND OF THE INVENTION

1. Field of the Invention

The present invention relates generally to flat panel display technologies and, more particularly, to a flat panel display, such as a head mounted display and a process for its manufacture.

2. The Prior Art

Flat panel displays find many applications. Among these are computers, in particular lap-top computers, T.V. screens, video games and various military and space applications. Head mounted flat panel displays are smaller than conventional flat panel displays such as those employed in lap-top computers, T.V. screens and the like. Preferably, head mounted displays (HMDs) are of miniature size, i.e., about one inch square or less. For a representative HMD see U.S. Pat. No. 4,361,384 that issued to David A. Bosserman on Nov. 30, 1982, entitled "High Luminance Miniature Display." Miniature HMDs must not only be light in weight, they must also excel in luminance and must be rugged in construction. Adequate luminance is required in applications such as involving displays in aircraft cockpits or in submarine command centers. Adequate luminance also is required, in particular, where the miniature HMDs are in color.

Most present HMDs employ small cathode ray tubes (CRTs) for displaying visual information to an operator. As a consequence, they are heavy and cumbersome to handle. They also suffer from high power consumption and require large voltages to drive their CRTs. Improved versions of HMDs employ either photocathode image intensifiers, miniaturized CRTs or light emitting diodes (LEDs) for displaying visual information. See said U.S. Pat. No. 4,361,384. See also U.S. Pat. No. 5,060,027, that issued to Hart et al. on Oct. 22, 1991, entitled "Light Emitting Diode Array With Aligned Solder Bumps." Photocathode image intensifiers are, however, single purpose instruments since they cannot display information other than that emanating from the photocathode. Miniaturized CRTs and LED displays on the other hand, still suffer from excessive weights, high power consumption, limited resolution and safety problems.

Further improved versions of HMDs are hybrids in that they use thin film electroluminescent (TFEL) displays coupled to a photocathode image intensifier tube via a fiber optics input faceplate to provide a high luminance display adapted for use in daylight. See said U.S. Pat. No. 4,361,384; and also U.S. Pat. No. 4,733,128 that issued to Tohda et al. on Mar. 22, 1988; and U.S. Pat. No. 4,862,033 that issued to Migita et al. on Aug. 29, 1989. See also for an enhanced single-layer, multi-color luminescent display U.S. Pat. No. 4,987,339 that issued to James B. Robertson on Jan. 22, 1991. The addition of the photocathode image intensifier tube adds however to the cost, the weight and to the complexity of the resultant high luminance display system. It also eliminates the possibility of having such a system operated in full color. HMDs based on reflection systems on the other hand, in which an image is formed by an LED array and projected to an observer via an optical path, lack the resolution necessary for providing a high quality visual information. See said U.S. Pat. No. 5,060,027 in conjuction with said U.S. Pat. No. 4,361,384.

In addition to the requirement for adequate brightness of the display, even during brilliant daylight prevailing in aircraft cockpits, HMDs must meet demanding packaging and interconnect requirements. For, the smaller is the HMD, the more demanding become its packaging and interconnect requirements. In the manufacture of microelectronic devices, which require a large number of electrical connections, a new technology appropriately named flip-chip bump-bond technology, was developed to provide such a high yield interconnect despite packaging density. "Flip chip bonding lends itself to high packaging densities, faster circuits, and eliminates wire bonding. Various methods to obtain reliable processes are being investigated by many corporations. In general, a metal bump is grown on the chip, the substrate, or both. The chip is flipped over, aligned to the substrate, and bonded." See Michael Schneider, "Flip Chip Bonding Offers Packaging Alternative," *Hybrid Circuit Technology*, March 1988, pp. 29–31. Such flip-chip technology was applied, amongst others, to the manufacture of large scale integrated (LSI) silicon circuits on glass substrates, and to the manufacture of ferroelectric components. See U.S. Pat. No. 4,190,855 that issued to Yukihiro Inoue on Feb. 26, 1980 and U.S. Pat. No. 5,070,026 that issued to Anton C. Greenwald et al. on Dec. 3, 1991, respectively. The latter U.S. Pat. No. 5,070,026 is assigned to a common assignee herein, to wit, Spire Corporation, Bedford, Mass. The flip-chip technology may have shown the way, yet its application to the manufacture of HMDs was still troublesome. As evident from said U.S. Pat. No. 5,060,027 to Hart et al, in the manufacture of LED arrays by flip-chip technology, the numbers and positions of the solder bumps must correspond to the numbers and positions of the LEDs, with "each driver circuit having a corresponding contact" with an LED. This requirement as to numbers and positions of drivers and corresponding contacts has thus far limited the practicality and use of miniature HMDs, in particular HMDs intended for full color use.

SUMMARY OF THE INVENTION

It is a principal object of the present invention to overcome the above disadvantages by providing a flat panel display, such as a head mounted display, and an improved process for its manufacture.

More specifically, it is an object of the present invention to provide a flat panel display essentially comprising a flat panel formed on a substrate and including a display material, a plurality of electrodes also formed on the substrate in intersecting rows and columns and in operative association with the display material, portions of the rows and columns peripherally extending beyond the area occupied by the display material, a plurality of bumps being formed on those portions of the rows and columns that peripherally extend beyond the electroluminescent material, a driver chip or chips formed on a wafer, preferably a single crystal silicon wafer, and including a plurality of driver circuits having terminals located about the periphery of the wafer, and a plurality of bumps formed on the wafer at those terminals in opposed operative alignment with the plurality of bumps formed on the peripherally extending rows and columns of the flat panel, said two sets of plurality of bumps being bump-bonded to one another. Preferably, the flat panel display is one of the group comprising thin film electroluminescent displays, passive matrix liquid crystal displays, plasma displays and field emission displays. The flat panel can be monochromatic, multi-color or full color. Preferably, the substrate is formed of glass or transparent plastic. The silicon wafer, on the other hand, can comprise a single-crystal wafer, a bonded silicon-on-insulator wafer, a SIMOX wafer or a bonded silicon-on-sapphire wafer. Preferably, the driver chip has a hold-off voltage of at least about 240 V.

Other objects of the present invention will in part be obvious and will in part appear hereafter.

The invention accordingly comprises the flat panel display of the present disclosure and the improved process of its manufacture, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 3 is a flow chart illustrating the inventive process of making a flat panel display according to the invention.

Detailed Description of the Preferred Embodiments

Figure 1:
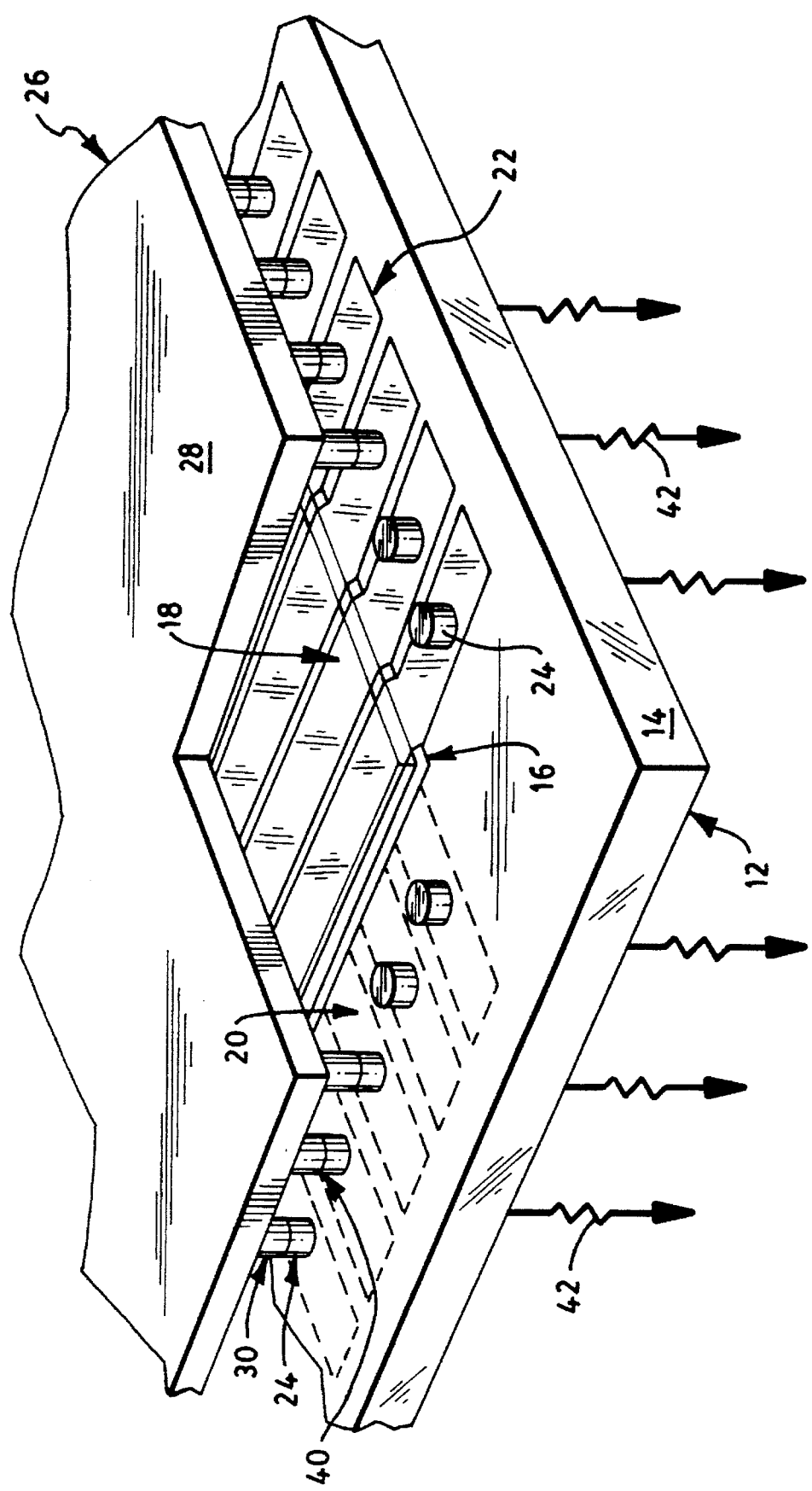
FIG. 1 is a schematic isometric view, on an enlarged scale, of a corner of a flat panel display constructed in accordance with and embodying the present invention.

Flat panel displays, in particular miniature head mounted displays (HMDs), find increased applications, in particular whenever hands-free transfer of video information is desired as for various entertainment, military and space applications.

HMDs must be reliable, rugged, exhibit good luminance even in daylight conditions, yet be light in weight and requiring modest power consumption and low voltages for their operations to be of practical and widespread use.

Essentially and in general, the invention pertains to an improved flat panel display 10, particularly to a miniature HMD, that effectively addresses the problems heretofore encountered in a practical manner. The flat panel display 10 basically comprises a flat panel 12 including a transparent substrate 14 provided with a display material 16, itself covered by a transparent layer 18. The display material 16 can comprise a thin film EL display material, a passive matrix display material, a plasma display material or a field emission display material. A plurality of electrodes are arranged in intersecting rows 20 and columns 22 and in operative association with the display material 16. As is clearly evident, both the rows 20 and the columns 22 of the electrodes have portions thereof which extend peripherally beyond the area covered by the display material 16, the significance of which will become evident from the description below. A plurality of bumps 24 are formed on these peripherally extending portions of the rows 20 and columns 22 of the intersecting electrodes. A driver chip 26 (or chips) formed on a wafer 28 is complementarily arranged to the substrate 14 and denotes the other half of the flat panel display 10. The driver chip 26 (or chips) also includes a plurality of bumps 30 formed thereon in opposed operative alignment with the plurality of bumps 24 formed peripherally on the rows 20 and columns 22 of the electrodes formed on the flat panel 12.

Figure 2:
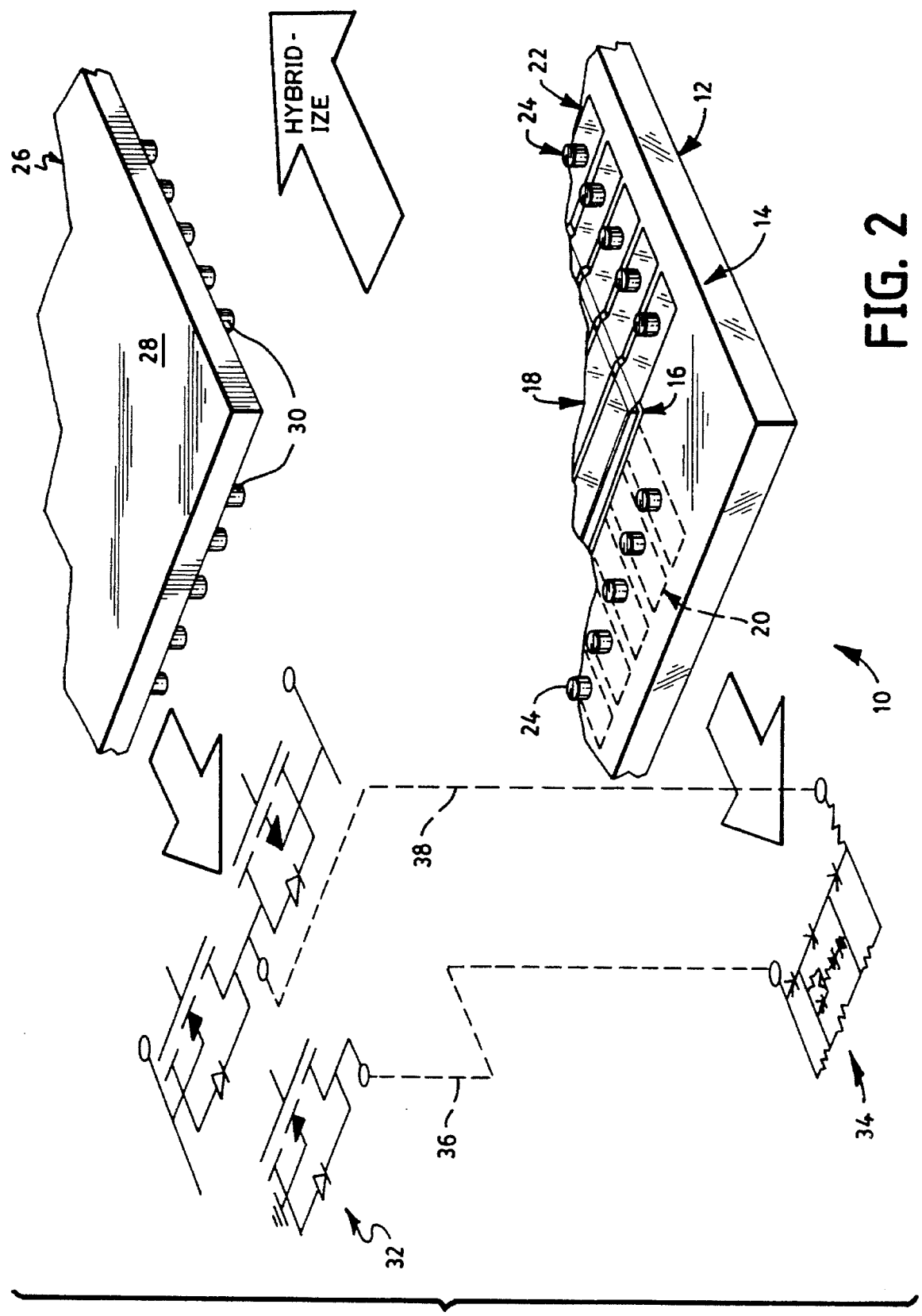
FIG. 2 is a view similar to FIG. 1 but illustrating the construction of the flat panel display shown in FIG. 1.

High voltage row and column driver circuitry 32 (note FIG. 2) also is provided on the driver chip 26 (or chips) having electrical connections to the plurality of bumps 30 formed thereon. The flat panel display 10, it is to be noted, contains many pixels, each of which can be represented by an equivalent circuit 34 having electrical connections to the plurality of bumps 24 formed on the panel 12. Dashed lines 36 and 38 show the interconnections between the two circuitries 32 and 34, when the panel 12 is mated to its driver chip 26 (or chips) upon the bump-bonding to each other of the respective pluralities of bumps 24 and 30, as illustrated in FIG. 1. Preferably, as a final step involved in the mating of the panel 12 to the chip 26 (or chips), a wick-in of epoxy, illustrated as at 40, is effected along the rows of the mated plurality of bumps 24 and 30 and in between the two components 12 and 26. The wicked-in epoxy provides added mechanical strength to the resultant display 10 and also provides additional dielectric strength to prevent arcing between adjacent mated bumps.

In the flat panel display 10 of the invention, light emission, as indicated by arrows 42, occurs by the application of an AC voltage to the coupled circuitries 32 and 34 at the intersections of particular rows 20 and columns 22 of electrodes, with the display 10 being viewed through the transparent substrate 14. Pixel addressing is effected in the passive matrix manner. In the passive matrix approach, the number of drive transistors and interconnects (i.e., the mated bumps 24 and 30) equals the sum of the numbers of the rows 20 and columns 22. For a multi-color or full-color display panel 10, number of the rows 20 need be multiplied by the number of colors, that is for the three basic colors of red, green and blue pixels in the case of a full color display.

Assuming a flat panel display size of about 1.0"×1.0", with a pixel count of 1,000×1,000 for good resolution, a monochromatic display requires 2,000 drive transistors and bump interconnects. A full color display of the above requires (1,000×3)+1,000=4,000 drive transistors and interconnects, readily achievable by the inventive process herein, as more fully described below. Center to center spacing between the bumps is about 50 um, and the combined bump dimension (that is, both 24 and 30) is from about 7 um to about 10 um.

The flat display 10 of the invention can be an HMD, a thin film electroluminescent display, an active matrix liquid crystal display, a plasma display or a field emission display. Their relative sizes will vary, depending upon their particular applications. Further, the flat panel display 10 can be monochromatic, multi-color or full color.

In the case of thin film electroluminescent displays, the electroluminescent material preferably is one of the group consisting of: MS and $MGa_2S_4$, where M equals Cd, Zn, Mg, Ca or Sr, or suitable mixtures thereof. Preferably, the rows 20 of electrodes are transparent electrodes formed as one of the group consisting of tin oxide, (TO) and indium tin oxide, (ITO). Preferably, the columns 22 of electrodes are formed of metal, such as aluminum, gold, chrome or silver. Preferably, the plurality of bumps 24 and 30 are formed as one of the group consisting of gold, indium, gold eutectics and solders. The substrate 14 preferably is transparent glass or plastic. Preferably, the driver chip 26 (or chips) for the thin film EL HMD has a hold-off voltage of at least about 240 V. Preferably, the plurality of bumps 24 and 30 are formed either by electroplating through a photolithographic mask or by thin film deposition technique, followed by lift-off. Preferably, the opposed plurality of bumps 24 and 30 are bump bounded to one another by the application of heat and/or ultrasonic power thereto.

Electroluminescent displays essentially comprise two types: powder EL devices and thin film EL devices. The former are formed by grinding the phosphor crystals into a powder, mixing it with a binder and a solvent, and spreading the mixture onto a substrate. In contrast, TFEL devices basically are formed by growing a single-layer of host phosphor, such as ZnS, on a substrate by resistance or E-beam evaporation or RF sputtering.

Alternatively, MOCVD or its variant, ALE, also can be used. Color is then introduced into the host layer by adding an activator, such as for example $TbF_3$ for green, $TbF_3$ and Mn for red, and Ce or Tm for blue. The activator can be introduced by thermal diffusion, ion implantation or vacuum deposition.

The flat panel 12 of the display 10 herein can be fabricated by a variety of approaches. Preferably, the flat panel 12 is fabricated using a transparent substrate 14 formed of glass, such as Corning 7059 barium-borosilicate glass made by the Corning Glass Company. The multi-layer structure thereof, including the display material 16, preferably is formed on the substrate 14 by evaporation or sputtering and includes: the rows 20 of transparent electrodes, the display material 16 (typically ZnS:Mn) sandwiched between two insulating layers (typically SiON), the columns 22 of metallized electrodes (typically aluminum), and a transparent passivation layer 18 (typically also glass).

The driver chip 26 (or chips) can be formed by any integrated circuit fabrication technology capable of providing appropriate drive signals to the display 10 and preferably is fabricated in a silicon industry foundry using high voltage complementary metal-oxide semiconductor (HVCMOS) design rules, such as practiced by Texas Instruments Corporation and Supertex Inc., for example. Preferably, the wafer 28 is a bonded-silicon-on-insulator wafer (B-SOI), a single-crystal wafer, a SIMOX wafer or a bonded-silicon-on-sapphire wafer, depending upon the final application of the resultant flat panel display 10.

A preferred process for practicing the invention is best described with reference to FIG. 3 which is a flow chart 50 illustrating the manufacturing steps for making a flat panel display using TFEL flat panel technology.

As evident from FIG. 3, the TFEL panel 12 and the driver chip 26 are fabricated and tested separately, resulting in higher yields and more reliable products for the final display 10. While the description in FIG. 3 is primarily with respect to TFEL flat panel technology, any deviations therefrom to practice AMLCD, plasma and FED technologies is within the knowledge of those skilled in those arts.

First, in the TFEL panel fabrication illustrated in the flow chart 50 of FIG. 3, a glass substrate 52 is provided. Material for forming the row electrodes is next deposited, as at 54, on the substrate 52, followed by patterning 56 the row electrodes 20 therefrom. The electroluminescent material 16 preferably is formed in four separate deposition steps. First, a first insulator material, such as SiON, is deposited 58, followed by the deposition 60, preferably by MOCVD, of the host phosphor material ZnS. The color activators for single or multi-color displays are next ion-implanted 62 into the host phosphor, followed by a further deposition 64 of a second insulator, also typically SiON, and then anneal 66 to correct for damage.

The column electrodes 22 are formed by first depositing 68 a layer of material for forming the column electrodes, followed by patterning 70 the same. The plurality of bumps 24 are formed 72, as shown, on the peripherally-extending portions of the rows 20 and columns 22 of electrodes. The respective size of the particular display 10 is then diced 74, followed by burn-in 76 and testing 78 of the now completed miniature flat panel display 10.

The driver chip 26 fabrication proceeds separately by providing 80 a silicon wafer and forming thereon, preferably by HVCMOS, the EL driver chip as at 82, followed by formation 84 of the bumps 30. The wafer next is diced 86 to form a plurality of individual driver chips 26, which are then tested 88. The separate fabrication and testing of the two main components 12 and 26 results in more reliable displays 10 and higher yields of the completed product.

After flipping the driver chip 26 (or chips) over, the components 12 and 26 are aligned 90 and are bump-bonded 92 to each other, followed by epoxy wick-in 94 and final testing 96 of the now completed flat panel display 10.

Thus it has been shown and described a flat panel display 10 and a method for its manufacture, which display and method satisfy the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A miniature flat panel display comprising:
   (a) a substrate and a display material;
   (b) a plurality of electrodes arranged in intersecting rows and columns in operative association with said display material;
   (c) said rows and columns of electrodes having portions peripherally extending beyond said display material;
   (d) a plurality of bumps formed on said peripherally extending portions of said electrodes;
   (e) at least one driver chip formed on a wafer and including a plurality of bumps formed thereon in opposed operative alignment with said plurality of bumps formed on said electrodes and being bump bonded thereto in a passive matrix addressed configuration; and
   (f) an epoxy wicked-in adjacent said plurality of bumps.

2. The miniature flat display of claim 1 wherein said flat panel display is one of the group consisting of: head mounted displays, thin film electroluminescent displays, passive matrix liquid crystal displays, plasma displays and field emission displays.

3. The miniature flat panel display of claim 1 wherein said miniature flat panel display is one of the group consisting of being monochromatic, multi-color and full color, wherein said multi-color panel is one capable of displaying a finite number of colors which cannot be combined to form white.

4. The miniature flat panel display of claim 1 wherein said display material of said miniature flat panel is one of the group consisting of thin film electroluminescent display material, passive matrix liquid crystal display material, and plasma display and field emission display materials, and wherein said thin film electroluminescent display material is one of the group comprised of: MS or $MGa_2S_4$, where M equals Cd, Zn, Mg, Ca, Sr or mixtures thereof.

5. The miniature flat panel display of claim 1 wherein said rows of electrodes are transparent electrodes formed as one of the group consisting of tin oxide and indium tin oxide.

6. The miniature flat panel display of claim 1 wherein said columns of electrodes are formed as one of the group consisting of aluminum, gold, silver and chrome, or of transparent electrodes such as tin oxide and indium tin oxide.

7. The miniature flat panel display of claim 1 wherein said plurality of bumps are formed as one of the group consisting of gold, indium, gold eutectics and solders.

8. The miniature flat panel display of claim 1 wherein said substrate is formed as one of the group consisting of glass, plastic, quartz, sapphire, and said wafer is one of the group consisting of a single crystal wafer, a bonded silicon-on-insulator wafer, a SIMOX wafer, and a bonded silicon-on-sapphire wafer.

9. The miniature flat panel display of claim 1 wherein said driver chip has a hold-off voltage of at least about 240 V.

10. A process of making a miniature flat panel display device comprising: (a) forming a substrate, including a display material; (b) forming a plurality of electrodes in intersecting rows and columns on said substrate in operative association with said display material, said rows and columns including portions peripherally extending beyond said display material; (c) forming a plurality of bumps on said peripherally extending portions of said electrodes; (d) forming a driver chip on a wafer; (e) forming a plurality of bumps on said driver chip in opposed operative alignment with said plurality of bumps formed on said electrodes; (f) coupling said driver chip to said miniature flat panel by bump-bonding their said respective opposed plurality of bumps to each other to form said miniature flat panel display; and (g) wicking-in epoxy about said respective opposed plurality of bumps bump-bonded to each other.

11. The process of claim 10 wherein said display material of said miniature flat panel is formed by growing a layer of host phosphor material on said substrate and introducing color therein by adding one or more activators by one of the processes consisting of: ion implantation, thermal diffusion, vacuum deposition, simultaneous thin film deposition of the host phosphor and activator materials by resistance evaporation, E-beam evaporation and RF sputtering, MOCVD deposition and ALE deposition.

12. The process of claim 10 wherein said rows and columns of said electrodes are formed by one of the processes consisting of: sputtering, vacuum deposition and evaporation through a mask.

13. The process of claim 10 wherein said plurality of bumps are formed by one of the processes consisting of: electroplating through a mask and thin film deposition and lift-off.

14. The process of claim 10 wherein said driver chip is formed by an integrated circuit fabrication technology, said driver chip capable of providing appropriate drive signals to said miniature flat panel display.

15. The process of claim 10 wherein said bump-bonding said respective opposed plurality of bumps to each other is effected by one of the processes consisting of: applying pressure only, applying heat and pressure, and applying ultrasonic power.

16. The process of claim 10 further including a step of separately testing said panel and said driver chip before their said coupling to one another by said bump-bonding said plurality of bumps.

17. The process of claim 10 wherein said display material of said miniature flat panel is one of the group consisting of thin film electroluminescent display material, passive matrix liquid crystal display material, plasma display material and field emission display material.

* * * * *